(12) United States Patent
Fujiyoshi

(10) Patent No.: US 9,167,803 B2
(45) Date of Patent: Oct. 27, 2015

(54) DEVICE FOR FARMING BENTHIC ORGANISMS SUCH AS BIVALVES

(76) Inventor: Yoshihiro Fujiyoshi, Kamiamakusa (JP)

( * ) Notice: Subject to any disclaimer, the term of this patent is extended or adjusted under 35 U.S.C. 154(b) by 76 days.

(21) Appl. No.: 13/809,809

(22) PCT Filed: Jul. 12, 2011

(86) PCT No.: PCT/JP2011/065834
§ 371 (c)(1),
(2), (4) Date: Mar. 26, 2013

(87) PCT Pub. No.: WO2012/008424
PCT Pub. Date: Jan. 19, 2012

(65) Prior Publication Data
US 2013/0180461 A1    Jul. 18, 2013

(30) Foreign Application Priority Data
Jul. 15, 2010    (JP) .................................. 2010-160815

(51) Int. Cl.
*A01K 61/00*    (2006.01)
(52) U.S. Cl.
CPC ............... *A01K 61/002* (2013.01); *A01K 61/00* (2013.01)
(58) Field of Classification Search
CPC ............................. A01K 61/002; A01K 61/00
USPC .......................... 119/204, 209, 210, 234, 240
See application file for complete search history.

(56) References Cited

U.S. PATENT DOCUMENTS

| 517,652 | A | * | 4/1894 | Mann | 119/234 |
| 3,650,244 | A | * | 3/1972 | Fordham | 119/237 |
| 3,727,579 | A | * | 4/1973 | Lee | 119/201 |
| 3,741,159 | A | | 6/1973 | Halaunbrenner | |
| 3,815,546 | A | * | 6/1974 | Plante | 119/210 |
| 3,870,019 | A | * | 3/1975 | McNicol | 119/241 |
| 3,889,639 | A | * | 6/1975 | Day et al. | 119/211 |
| 4,007,709 | A | * | 2/1977 | Wishner | 119/210 |
| 4,198,924 | A | * | 4/1980 | Chapman | 119/210 |
| 4,377,987 | A | * | 3/1983 | Satre | 119/241 |
| D304,870 | S | * | 11/1989 | Mason | D30/115 |
| 5,515,813 | A | * | 5/1996 | Wilkerson | 119/223 |
| 6,578,523 | B2 | * | 6/2003 | Gagnon | 119/234 |
| 7,870,836 | B2 | * | 1/2011 | Froyland | 119/209 |
| D681,771 | S | * | 5/2013 | Kaufmann | D22/121 |

FOREIGN PATENT DOCUMENTS

| JP | 52-016952 | 5/1977 |
| JP | 2002-010723 | 1/2002 |
| JP | 3493357 | 2/2004 |
| JP | 2007-159507 | 6/2007 |

* cited by examiner

*Primary Examiner* — Rob Swiatek
*Assistant Examiner* — Ebony Evans
(74) *Attorney, Agent, or Firm* — Jordan and Hamburg LLP

(57) ABSTRACT

A farming device for benthic organisms, which is submerged in a water tank or a body of water, is constituted of a plurality of tray-form containers, which are the cultivating floor for benthic organisms such as bivalves, and are stacked in the vertical direction, with a central cavity passing through the stacked cultivating floors in the vertical direction and horizontal gaps defined between the cultivating floors, the cultivating floors communicating with the cavity.

5 Claims, 16 Drawing Sheets

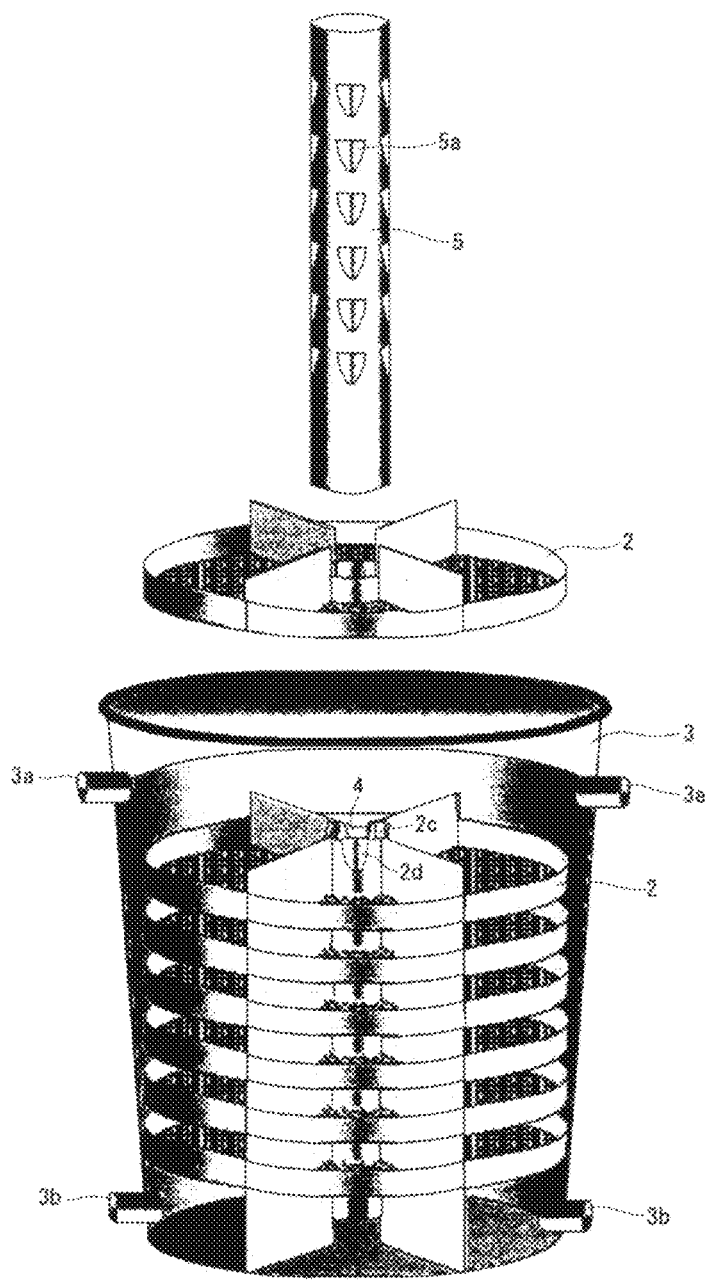

DEVICE FOR FARMING BENTHIC ORGANISMS SUCH AS BIVALVES

BACKGROUND OF THE INVENTION

The present invention relates to a device for farming benthic organisms such as bivalves, and particularly relates to a device used for farming benthic organisms living in an environment exposed to tides, such as *venerupis philippinarum, meretrix lusoria*, and corbiculidae.

Bivalves, of which *venerupis philippinarum, meretrix lusoria*, corbiculidae, and the like are representative, are typical popular Japanese seafood and are sources of marine protein that can be inexpensively taken by the masses. However, currently, due to a decrease of sand beaches, tidal flats, and the like, due to water pollution of the ocean regions, coastal bank reinforcement, and the like, reserves and catches have declined sharply. Currently, to preserve the reserves and catches for bivalves, farming is being done in various regions, and many of the farming methods artificially seed spats on the sea coast and then cultivate these in a natural environment. However, these conventional farming methods are influenced by changes in the ocean region environment, have expensive production costs, and cannot provide the market with a stable supply.

Meanwhile, looking at actions affecting the bivalve environment, in terms of methods for feeding bivalves, minute phytoplankton, which floats suspended in the sea water, and detritus, which is broken pieces of the same, are filtered by way of gills, and in terms of the filtration capacity thereof, *venerupis philippinarum* with a shell length of approximately 3 cm filters approximately 3 liters of seawater per day, contributing to purification of the ocean region, in which eutrophication materials are removed.

In terms of broadly classifying conventional technology proposed for shellfish farming devices, this can be divided into mariculture and land-based farming. Because, for farming devices in the ocean, spats are cultivated by enclosing a plate or the like to which spats are attached with a net and lowering into seawater, it has the merit of easily providing an environment that is comparatively close to the natural habitat conditions (see JP-3913669-B and Patent Document 2 JP-3979746-B). However, the selling price for bivalves is low, and production costs are an issue, thus bivalves remain in a low position as farmed seafood. In particular, at present, costs are a problem in terms of achieving land-based farming, and thus this has not been substantially implemented.

For example, in JP-3493357-B, farming facilities for abalone on land are described. In terms of these farming facilities for abalone, an abalone breeding tank is arranged in multiple levels, and the abalone breeding tank is provided with a water supply pipe that supplies seawater and an overflow pipe, furthermore, an air supply pipe and a feed supply area are also fixed in the breeding tank. Furthermore, in addition to causing seawater to flow into the water supply pipe with a pump, by lowering the overflow pipe, the seawater flows to the lower level water tank, so that the flow of seawater is promoted. Furthermore, for the air supply pipe, air is provided with a blower, and compressed air is sprayed out as froth. Thus, dissolved oxygen is supplied.

SUMMARY OF THE INVENTION

However, with conventional land-based farming devices for shellfish, achieving a clean environment in which tide passage is good, such as where shellfish live, is difficult. Specifically, because the water easily stagnates, the quantity of dissolved oxygen in the water decreases, so that there were problems in terms of the removal of residual feed or excreta being difficult, and shellfish being readily subject to disease. The present invention is directed to solving the problems of the conventional farming technology that could depend only on the natural environment, and an object thereof is to provide a farming device that not only can provide an inexpensive and stable quantity of benthic organisms, such as bivalves, to the market, but also can create a flow of fresh water, prepare an environment similar to the natural habitat, and increase the cultivated quantity per unit area.

In order to achieve the aforementioned object, a farming device for benthic organisms such as bivalves of the present invention is firstly characterized by being submerged in a water tank or a body of water, and in that a plurality of tray-form containers, which are the cultivating floor for benthic organisms such as bivalves, are stacked in the vertical direction, a central cavity passes through the stacked cultivating floors in the vertical direction, and horizontal gaps are defined between the cultivating floors, which communicate with the cavity. Furthermore, this is secondly characterized in that the tray-form containers are configured to be partitionable. Moreover, this is thirdly characterized in that a bubble generator or a flow generator is provided so that water flows into and out of the device. Moreover, this is fourthly characterized in that a water supply and discharge tube and valve are provided on the water tank, and the water tank water level, and water supply and discharge volumes are adjustable.

BRIEF DESCRIPTION OF THE DRAWINGS

FIG. 2 is a skeleton perspective view showing another embodiment of a farming device according to the present invention.

DETAILED DESCRIPTION OF THE INVENTION

Figures 1A, 1B:
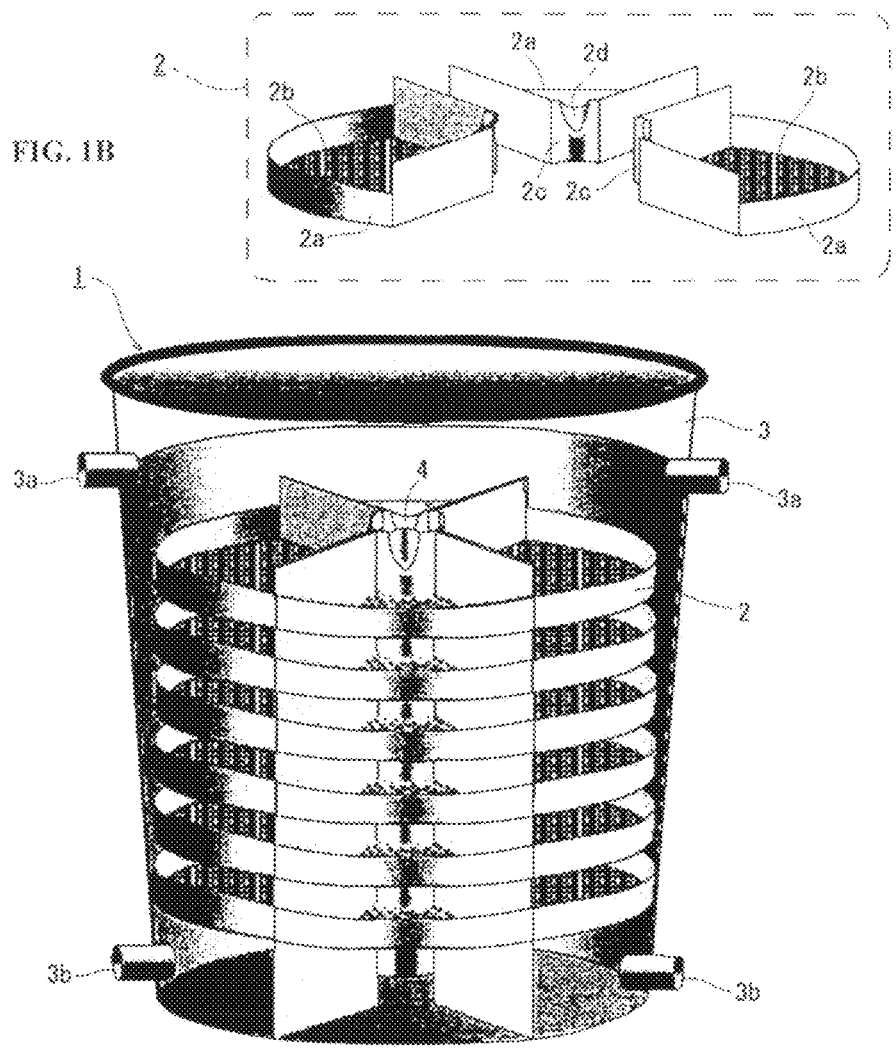
FIG. 1A is a skeleton perspective view showing an embodiment of a farming device according to the present invention and FIG. 1B is a detail thereof.

A farming device 1 according to the present invention, as shown in FIG. 1A and FIG. 2, is configured such that a plurality of circular cultivating trays 2 are layered in multiple levels, and are contained in a cup-shaped water tank 3, wherein the diameter of the bottom portion is less than that of the upper portion. The central section of the layered cultivating trays 2 has a structure whereby a circular tubular central cavity 4 is formed in the water tank 3, from the bottom to the top.

Here, as shown in FIG. 1B, the cultivating tray 2 is configured by combining four shellfish storage sections 2a, which are divided into fan shapes in the circumferential direction; a net body 2b made of punched metal, mesh filter, or the like, is provided stretched on the bottom face of the shellfish storage sections 2a. Then, by layering the cultivating trays 2 in the vertical direction, arcuate recesses 2c of the cultivating trays 2 are stacked so that the circular tubular central cavity 4 is defined on the central axis. Configuring the cultivating trays 2 divided in this manner, facilitates observation and harvesting.

Furthermore, the device shown in FIG. 2 has a structure wherein a cylindrical tube 5 is inserted and engaged in the circular tubular central cavity 4. Protrusions 5a are formed in arbitrary locations on the surface of the cylindrical tube 5, and are male-female fit into engaging dimples 2d of arc recesses 2c on the contact face of the cultivating tray 2.

Figure 3:
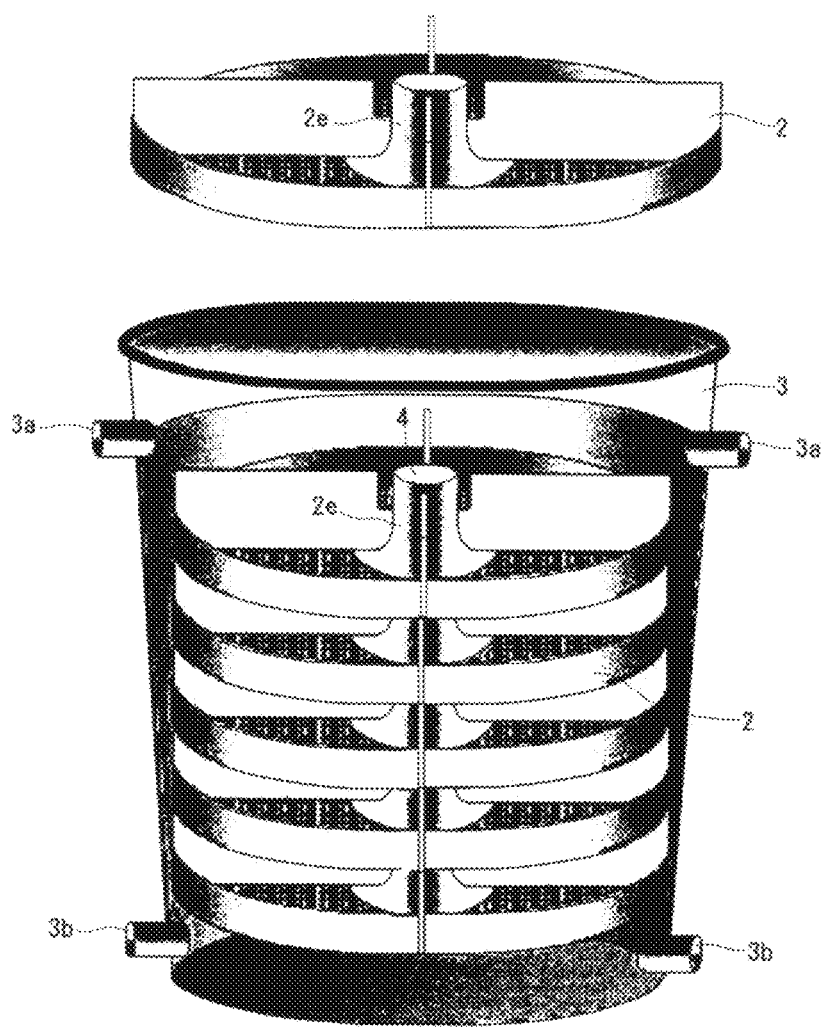
FIG. 3 is a skeleton perspective view showing another embodiment of a farming device according to the present invention.

The farming device 1 shown in FIG. 3 has a configuration wherein the central cavity 4 is sectionally formed by way of layers of conical form sheets 2e. Thus, the shape of the central cavity 4 is not limited to being a circular tubular shape as described above, but may also be a rectangular tubular shape or an elliptical tubular shape, for example. Furthermore, the bottoms of the embodiment devices have raised bottom structures such that a space can be formed, but depending to the usage, the bottom face may serve as the base end.

The cultivating tray 2 according to the present embodiment is divided into fan shapes as shown in FIG. 1, but this can also have a circular unified structure, and this structure can be suitably varied in accordance with the situation during use or during manufacturing, there being no restrictions on the shape, so long as the structure provides the function. Furthermore, as described above, the bottom of the shellfish storage section 2a has an open punched structure or a mesh filter structure, which is a structure whereby seawater or fresh water that is used in cultivation can pass, but depending on the usage, the bottom plate may have a structure through which water does not pass.

The greatest characteristic of the device of the present invention is that the chimney-like central cavity 4, on the central axis of the layered body, is defined when the cultivating trays 2 are stacked in multiple levels, and that the outer circumferential edges of the cultivating trays 2 have structures that form gaps D1 when superimposed. Meanwhile, in the present embodiment, the exterior of the cultivating tray 2 has been described as circular, but this may be elliptical or rectangular as long as the functions and operation thereof are maintained.

Furthermore, in the present embodiment, the case of farming the benthic bivalves of *venerupis philippinarum* and *meretrix lusoria* is described, but the benthic organisms cultivated are not so limited, and this can also be applied to shellfish that grow in fresh water, such as oysters or corbiculidae.

Figure 4:
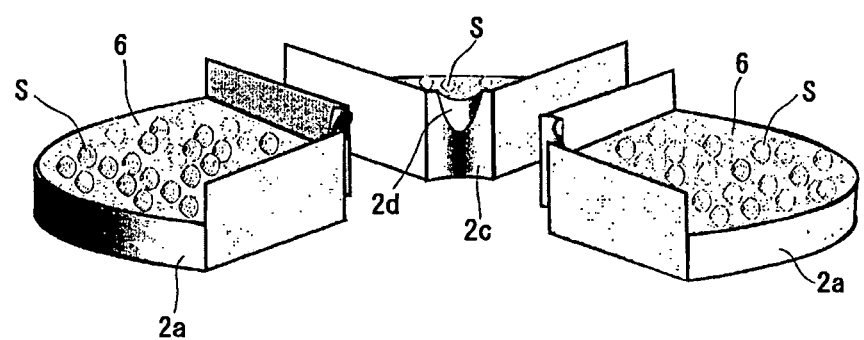
FIG. 4 is a perspective view showing a cultivating tray (cultivating floor).

As shown in FIG. 4, a cultivating medium 6 of sand or the like that is suitable for the targeted shellfish S is spread to the upper portion of the cultivating trays 2 on each level and cultivation-targeted shellfish S, such as *venerupis philippinarum* or *meretrix lusoria*, are set therein. After operating the device, *venerupis philippinarum* and *meretrix lusoria* are in a stable habitat after burying in the sand.

The farming device 1 according to the present invention is irrigated after cultivating trays 2 are assembled in the water tank 3 in multiple levels. In other words, the present farming device 1 is a structure wherein a sandy beach has been stacked so that area of the farming culture medium 6 is dramatically increased with regard to the installation area of the device. Note that in order to cultivate shellfish in the interior of the farming device 1, seawater must be made to flow; and in order to make seawater flow, the methods described below are used, but these may be selected in accordance to the usage situation or a procedure combining these may be used.

Figure 5:
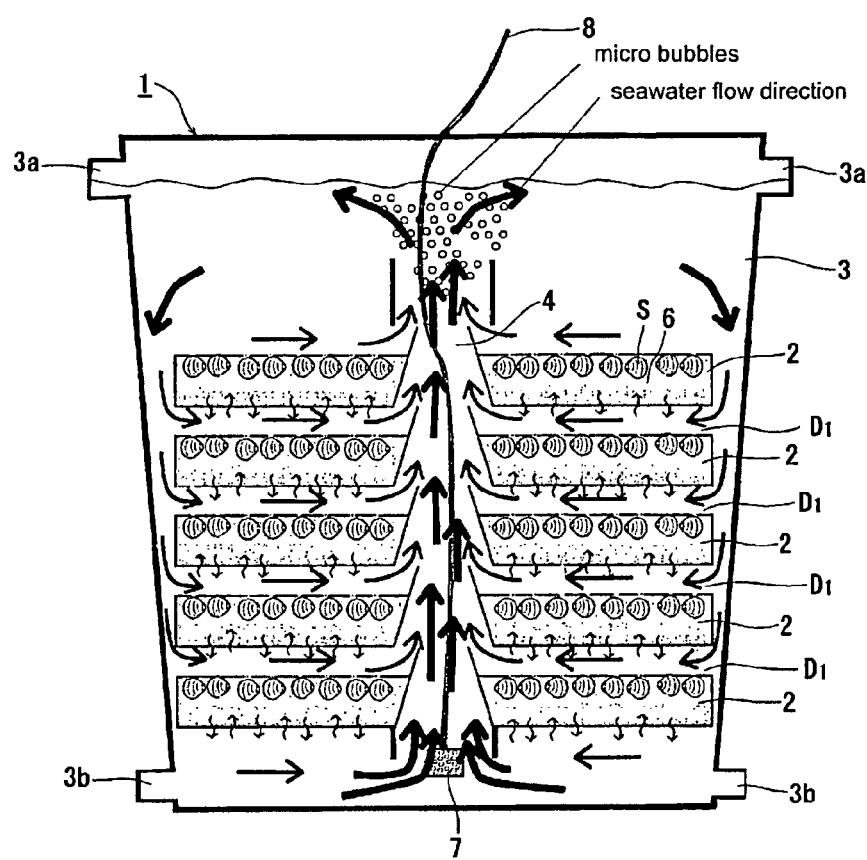
FIG. 5 is a longitudinal sectional view of a farming device showing a closed water system according to the present invention.

Here, water flow movement in the water tank is described, which results from the upward flow caused by aeration with micro bubbles, and by water supplied from the bottom of water tank 3. As shown in FIG. 5, the seawater W in the water tank 3 or the seawater W that is supplied rises in the central portion cavity 4 as a result of the upward force of air bubbles and the water pressure of the supplied water, and seawater W that is present in the gaps D1 between levels of cultivating trays 2 is drawn into the cavity 4 from the central opening portion of the cultivating trays 2 on each level at that time, by way of the entrainment action of the seawater W that is flowing. As a matter of course, after reaching the upper portion of the water tank 3, the seawater W drawn into cavity 4 is discharged along with the seawater W that was drawn in from other gaps D in the cavity 4, and the remaining seawater W forms a recirculating flow into the gaps D1 for each layer, via gaps D2, which are between the cultivating trays 2 and the wall face of the water tank 3. Furthermore, the water passes through and is filtered in the gaps in the farming culture medium 6, which is sand, for example, that is spread in cultivating tray 2, and flows into the gap D1 of a lower level. Thus, a water flow containing sufficient oxygen can be provided, so that a habitat environment can be provided with easy respiration and good water passage.

Figure 6:
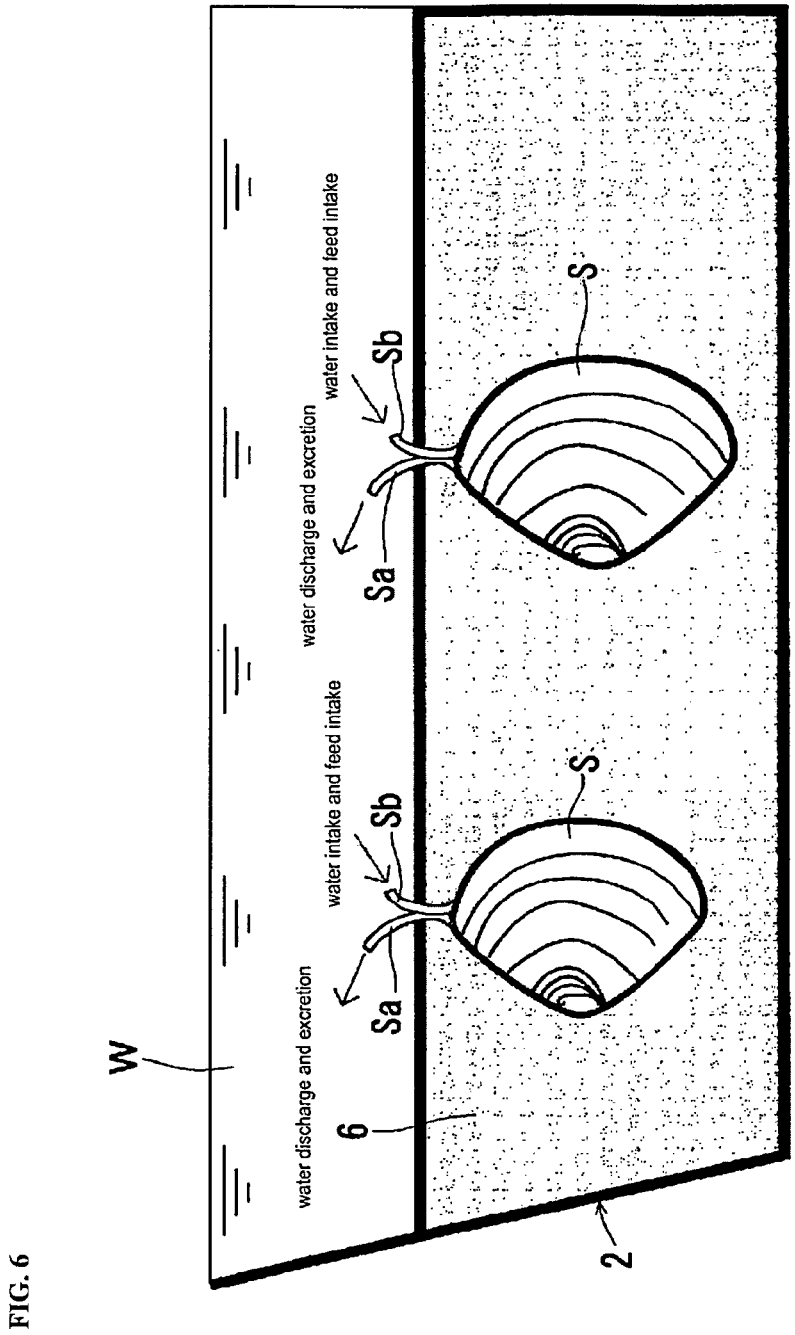
FIG. 6 is a sectional view of key elements of a cultivating tray (cultivating floor).

FIG. 6 shows a cross section of a cultivating tray 2 in a situation in which bivalves S are buried in the sand. The body of bivalves S are buried in the sand 6, but an inhalant siphon Sa and exhalant siphon Sb are exposed above the sand 6, for intake of dissolved oxygen for respiration and intake of organic material suspended in the sea, which is feed, drawing in water and feeding by filtering, from the seawater W directly above the sand surface. Accordingly, an important condition for the bivalves S to live is how to make cultivation environment immediately above the sand surface favorable. For example, *venerupis philippinarum* can take in seawater only for a distance of approximately several centimeters immediately above the sand surface. How good the seawater is or whether feed is available in layers that are higher than this is of no consequence.

Figure 7:
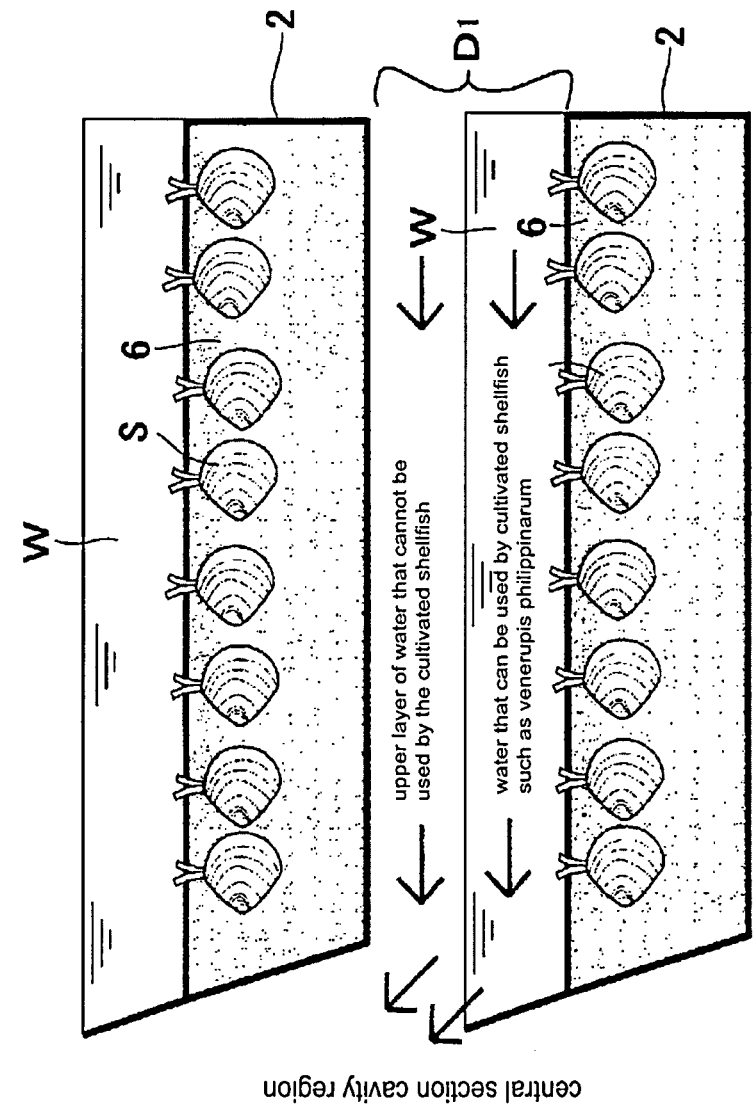
FIG. 7 is a sectional view of key elements showing a gap between cultivating trays (cultivating floors).
Figure 8:
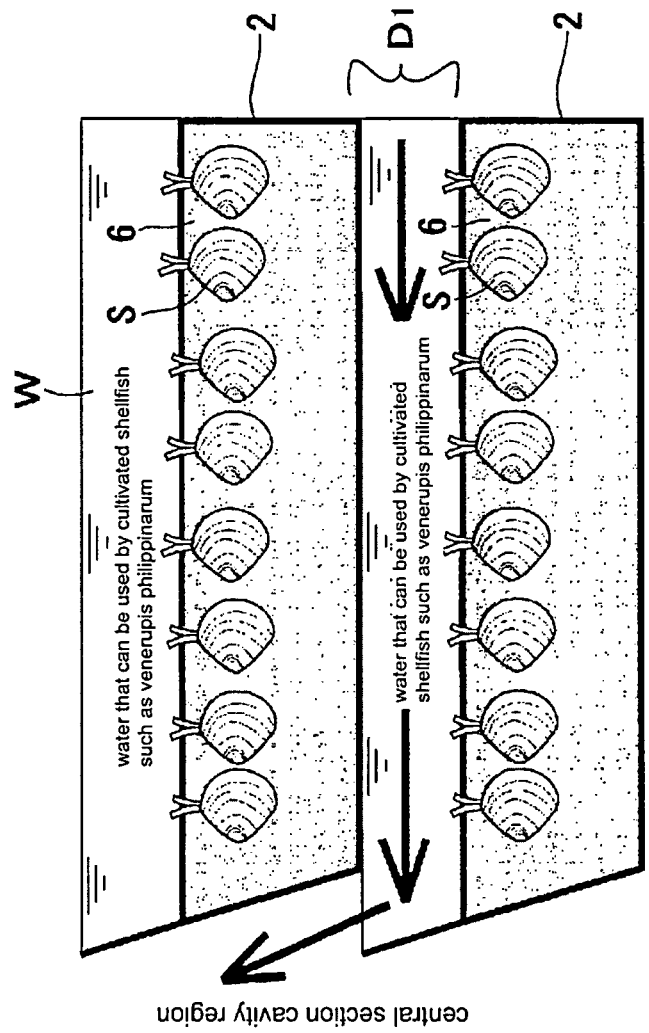
FIG. 8 is a sectional view of key elements showing a gap between cultivating trays (cultivating floors).

As shown in FIGS. 7 and 8, with the farming device 1, as a result of the capture flow of the seawater W and the communication in the direction of the central cavity 4, a flow always occurs in the gaps D1 between the levels of the cultivating trays 2, and by adjusting the size of the gap D1, the flow rate can be changed, so that an optimal flow rate can be set in accordance with the type of benthic organisms to be cultivated. In addition, by reducing the size of the gap D1, dissolved oxygen and suspended feed can be provided effectively with a smaller volume of seawater, so long as a water depth in a range that can be used by the benthic organisms being cultivated is maintained. With the present device 1, air sent from an air hose 8 is used for aeration by generating micro bubbles at the bottom of the central cavity 4 using an aeration blower 7 so that an upward flow occurs, and the aeration also contributes to the supply of dissolved oxygen in the seawater.

Meanwhile, organic material aggregate, which is said to be feces or pseudofeces of the cultivated shellfish and which is directly ejected from the mouth, is ejected into the sand and accumulate in the sand 6 along with sediment from the seawater. The organic pollutants are decomposed by bacteria in the sand 6, but if sufficient oxygen is not present in the sand 6, after an anaerobic decomposition process, contaminants, such as hydrogen sulfide, which is toxic to habitat organisms, increase, and in either case cultivated organisms cannot live. To avoid this, sufficient oxygen must also be continuously supplied in the sand 6. Furthermore, elution and washout action must be continued in order to prevent material generated by decomposition by way of bacteria from accumulating. With the present device 1, because water flow always occurs in gaps D1 between the levels of cultivating trays 2, the ceiling of gap D1, which is to say the punch holes or mesh filter of the bottom of a cultivating tray 2, is also washed.

Thus, gaps D1 do the essential work, and by having the width of gaps D1 be as narrow as possible, an effective flow rate can be generated with a small quantity of seawater allowing for transportation of dissolved oxygen and feed. As a matter of course, if the seawater in water tank 3 is not exchanged, the concentration of pollutants increases. Although it is necessary to exchange the seawater in the water tank 3 in accordance with pollution conditions, because the ratio of seawater used by the cultivated organisms in the water tank 3 is very high, the ratio of the unnecessary exchange of seawater can be lowered, in effect, allowing for a smaller quantity of exchanged seawater thus leading to reduction in costs for equipment, such as pumps to supply seawater, and other costs.

Furthermore, because the quantity of feed in the seawater decreases with the feeding activity of the cultivated organisms S, it is necessary to supply feed, such as microalgae, in accordance with this decrease; if there is sufficient amounts of feed and oxygen in the supplied seawater, or in the seawater in the water tank 3, there is no need to deliberately supply amounts of feed or oxygen. Furthermore, in cases where a short growing period suffices, independent circulation models, wherein seawater is not introduced from outside the water tank 3, can be used.

Figure 9:
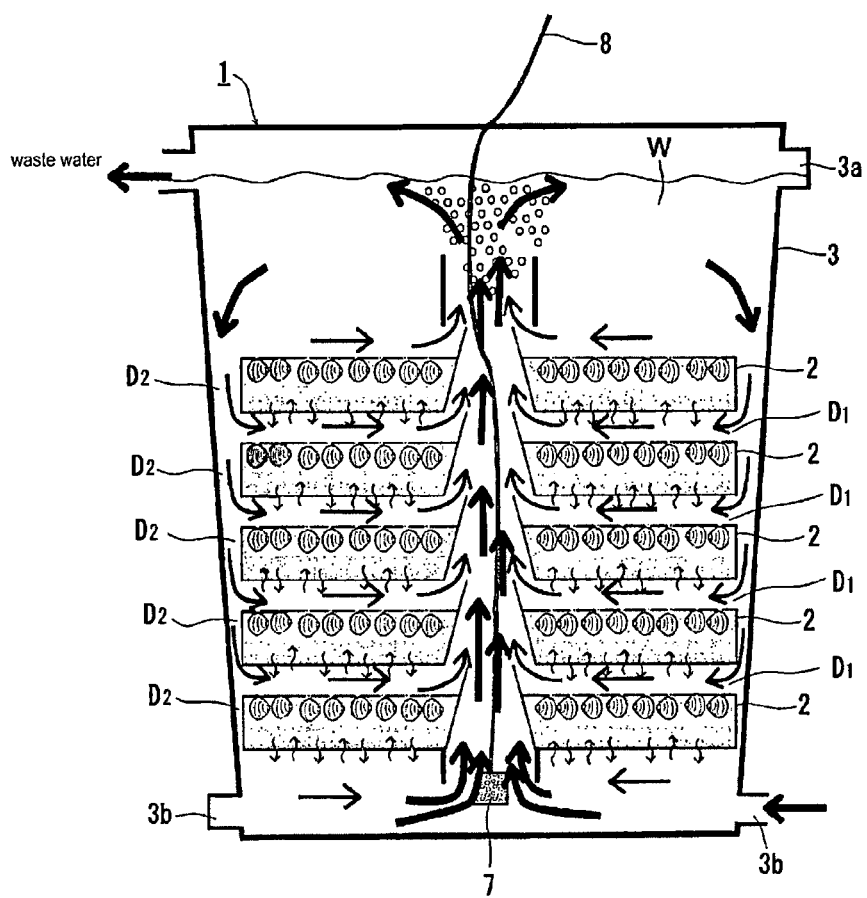
FIG. 9 is a longitudinal sectional view showing water being supplied to a farming device from the bottom.

FIG. 9 shows a method for supplying water from outside the water tank 3. In this manner, if there are sufficient amounts of dissolved oxygen and feed in the supplied seawater, the expected results can be achieved without aeration. Water discharge can be brought about by overflow from the top of the water tank 3 or water can be discharged from an upper water discharge pipe 5. Of course, if micro bubbles are generated in the interior of the central cavity 4 so as to promote upward flow in the cavity with the air lift method, then the efficiency of the circulating flow in the water tank is increased, as described above.

Figure 10:
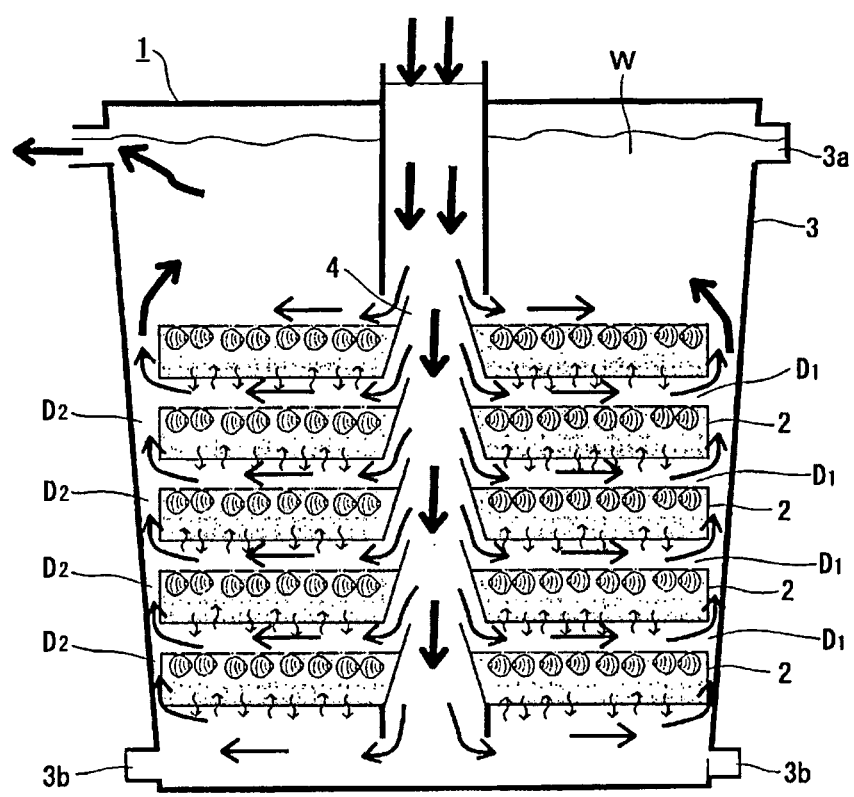
FIG. 10 is a longitudinal sectional view showing water being supplied to a farming device from the top.

In FIG. 10, a method in which seawater is introduced from the top of the central cavity 4 is shown; in this case, the top of the central cavity 4 must be raised higher than the water surface of the water tank 3. With this method, the upward flow in the central cavity 4 and the associated entrainment action do not occur. Conversely, the seawater W supplied in the central cavity 4 is distributed in the gaps D1 at each level, but the action of supplying dissolved oxygen and feed is similar to that in the method described above. This method can supply sufficient seawater from outside the water tank 3, and is effective if the supply body contains materials, such as dissolved oxygen or feed, in sufficient abundancy.

With either of the aforementioned methods, seawater can effectively contact and be circulated in the farming culture medium 6, and compared to conventional coastal farming that uses only the surface of the bottom, the accommodated population density per unit area on the bottom is dramatically increased by stacking cultivating floors and making this three-dimensional.

Figure 11:
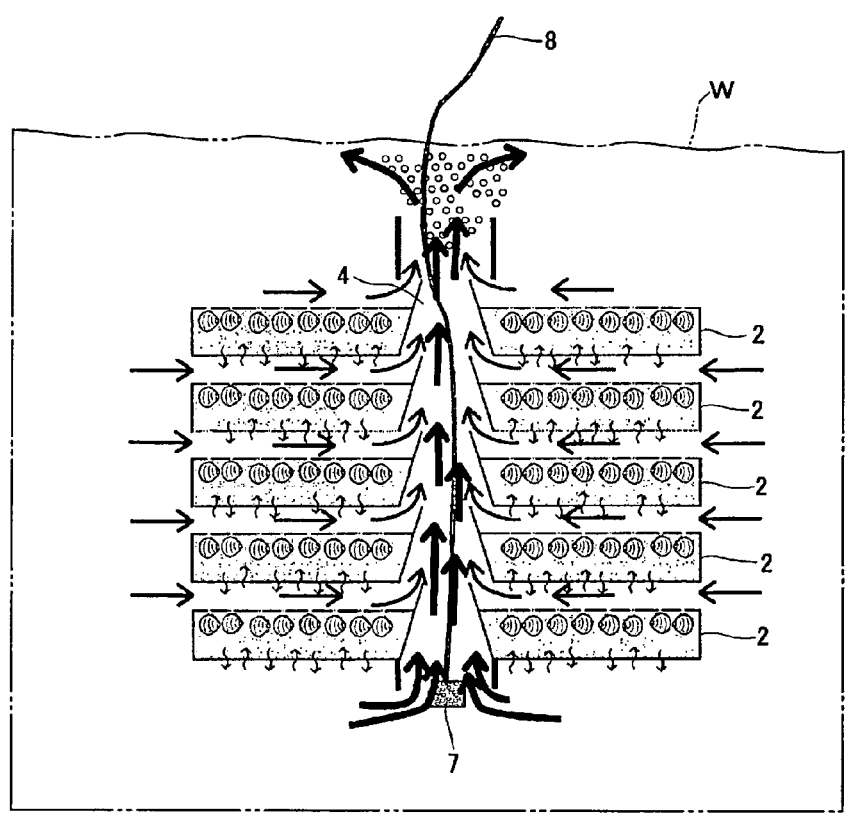
FIG. 11 is a longitudinal sectional view showing an example of a farming device that does not use a water tank.

FIG. 11 shows a method that uses only cultivating trays 2 without using a water tank 3. The gist of the present invention is that tidal currents occur in the gaps D1 between the cultivating trays 2. Accordingly, if this functionality is provided, the expected farming results are achieved without deliberately generating a circulating flow. In other words, a water tank 3 is required with land-based farming, but the invention may also be such that stacked cultivating trays 2 alone are settled in a bay or fishing port, and an upward flow or a downward flow is generated in the central cavity 4.

Hereafter, cultivating plants using the device of the present invention are described. Here, a plant indicates a system that uses a plurality of connected farming devices 1, which includes only cultivating trays 2 or also includes a water tank 3. Connecting methods can be broadly divided into: systems that use stored water, or wherein the water (seawater, fresh water, brackish water, and the like are conceivable but "seawater" is used here as a representative name) that is used is always stationary (here, this is called a water storage system); and systems in which low-tide and high-tide phenomena, which are observed in tidal flats or sandy beaches, are incorporated so that a water-holding state and a low-tide/tidal emersion state are repeated (here, this is called a tidal system).

Figure 12A:
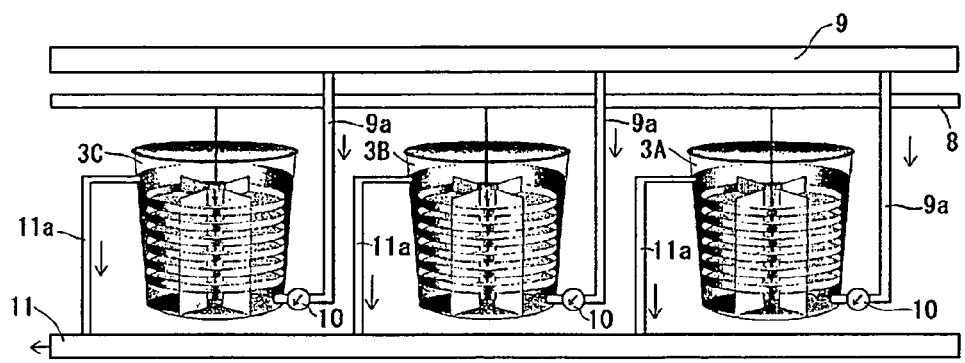
FIGS. 12A, B, C are each a schematic view of a cultivating plant using a device of the present invention.

Water Storage System Plant:

FIG. 12A is a system that supplies seawater W containing feed to a water tank 3 from the bottom of a water tank 3 of a farming device 1, wherein a plurality of cultivating trays 2 are layered in the water tank 3, and as this is always full, the seawater W that overflows from the water tank 3 is discharged in the water discharge pipe 11. A characteristic of the water storage system is that the system can be used together with aeration that generates an upward flow in a central cavity 4 by way of a blower 7, which is effective in terms of supplying seawater W to the water tanks 3 from the bottoms of the water tanks 3, such as in cases where the accommodated population density of cultivated organisms in the water tanks 3 differ, or if the amount of feed, such as microalgae, to be supplied is to be adjusted by way of the quantity of seawater supplied, such as in cases where spat cultivating water tanks and adult shellfish cultivating water tanks are combined in the same system. The seawater W can repeatedly flow through the gaps D1 between the levels, by way of a certain degree of circulating flow. With a view to taking advantage of this effect, it is possible to limit unnecessarily discharge of seawater W that was not used by the cultivated organisms by limiting the volume of water that is supplied to as great an extent as possible, in addition to which, the seawater exchange rate for each water tank 3 can be independently adjusted, simply by adjusting a water supply valve 10.

Figure 12B:
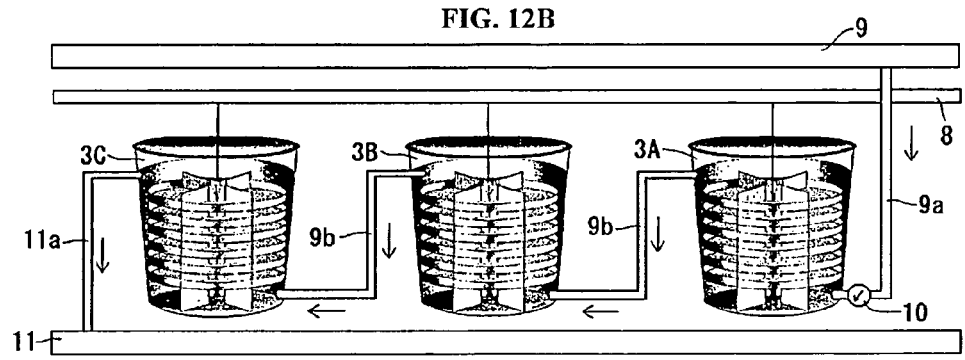

FIG. 12B shows a plant in which a upper water discharge opening 3a of a water tank 3A on the upstream side to which seawater is supplied, and the bottom water supply opening 3b of water tanks 3B and 3C on the downstream side are connected in series. The supplied seawater W flows from the upstream side water tank 3A toward the downstream side water tanks 3B and 3C and is employed, in an ordered manner, starting from the upstream side water tank 3A, whereby the feed quantity in the seawater decreases as this moves to the downstream side water tanks 3B and 3C, and the concentration of pollutants that are eluted from the culture medium 6 into the seawater also increases as this moves to the downstream side water tanks 3B and 3C. There are, however, advantages in so much as the water supply equipment and water discharge equipment can be comparatively simple and there is a savings in materials.

Figure 12C:
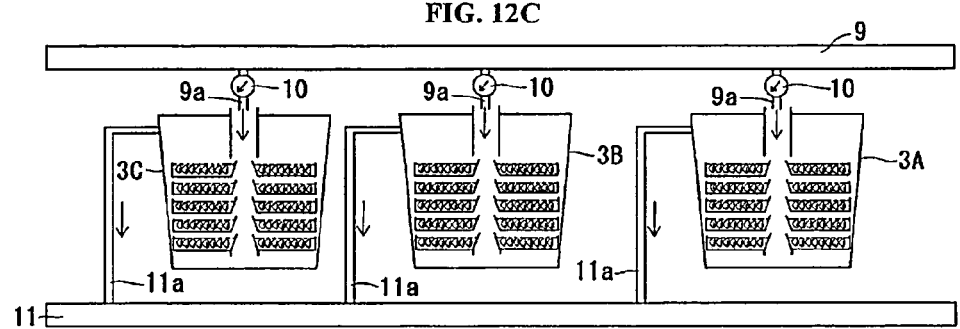

The plant shown in FIG. 12C is one wherein water is supplied by way of falling into the central cavity portion 4, from a position that is higher than the water level of the central cavity portion 4. Thus, a downward flow occurs in the central portion cavity 4 in accordance with the volume of water supplied, and a distributed flow is supplied in the gaps between levels of cultivating trays 2 from the central cavity portion 4 so that aeration is unnecessary. This method is effective in cases where use can be made of a comparatively abundant amount of supplied seawater (including dissolved oxygen and feed), and because no circulating flow is generated, the supplied seawater W flows through the interior of the device 1 only once. For this reason, there is a large amount of discharged water, in which feed not used by the cultivated organisms S is mixed, but there is an advantage in that the cultivated organisms S are always exposed to fresh seawater.

Figure 13A:
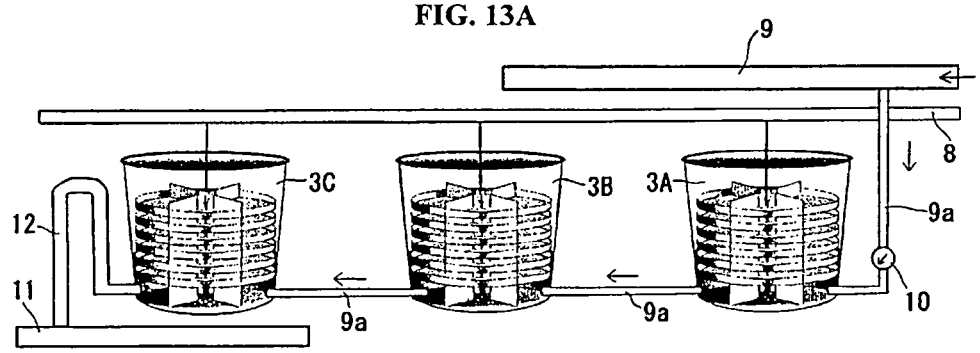
FIGS. 13A, B are schematic views of a cultivating plant using a number of devices of the present invention.
Figure 13B:
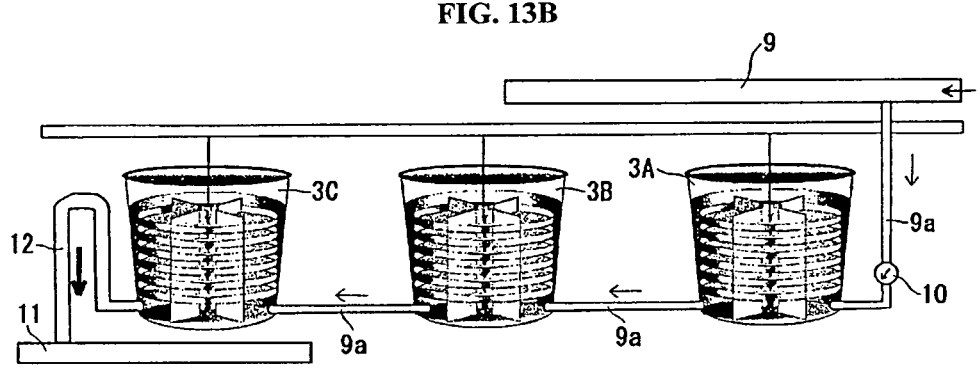

Tidal System Plant:

FIGS. 13A, B show a plant wherein the bottoms of water tanks 3A, 3B, and 3C are connected with a branching pipe 9a from a water supply pipe 9, and a branching pipe 12 from the water discharge pipe 11 of the endmost water tank 3C is an inverted U-shape such that water is discharged using the siphon principle. Accordingly, at first, when the water supply is started, the water surface for all water tanks 3A, 3B, and 3C rise to approximately the same water level, and the water surface continues to rise to the top of the branching pipe 12 of the water discharge pipe 11 (FIG. 13A). Then, when the water surface reaches the top-most position of the branching pipe 12 of the water discharge pipe 11, water discharge starts, and the water level starts to drop FIG. 13B. When the water surface drops to the water intake of the branching pipe 12 of the water discharge pipe 11, air is sucked in and water discharge stops, so that all of the water tanks 3A, 3B, and 3C are once again approximately simultaneously switched over to raising the water level. Thereafter, this rising and lowering of the water level repeats. The water level change time, in which the water level is raised and lowered, can be adjusted by way of the rate at which the seawater volume is supplied and the pipe diameter of the branching pipe 11a from the water discharge pipe 11, or depending on whether or not the water is supplied intermittently.

Figure 14A:
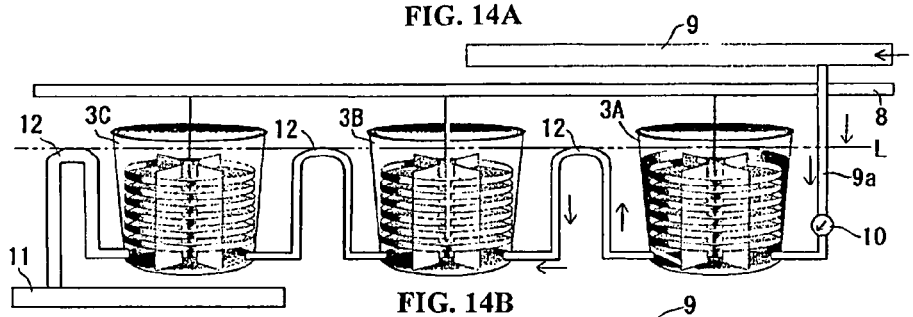
FIGS. 14A, B, C, D are schematic views of a cultivating plant using a number of devices of the present invention.
Figure 14B:
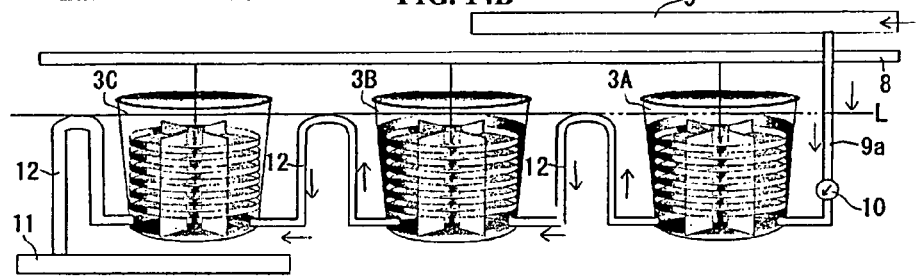
Figure 14C:
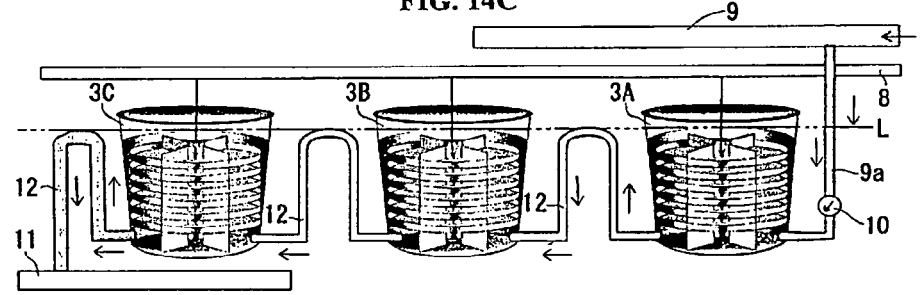
Figure 14D:
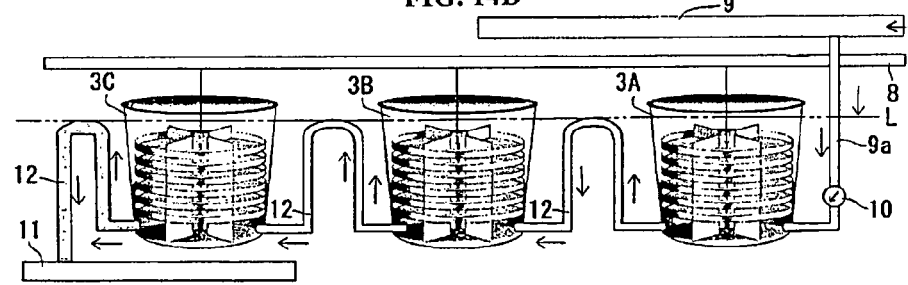

FIGS. 14A, B, C, D, show a plant wherein water tanks 3A, 3B, and 3C are connected with an inverted U-shaped pipe (called a water discharge siphon hereafter) 12. This method uses the water discharge siphon 12 on water tanks 3A, 3B, and 3C as a water supply pipe, and a phase difference occurs in the water level change for water tanks 3A, 3B, and 3C. In other words, when a first water tank 3A that is on the upstream water-supply side reaches a full water level L, the water discharge siphon 12 of the first water tank 3A starts to supply water to a second water tank 3B such that as the water level of the second water tank 3B rises, and the water level of the first water tank 3A drops at the same time. Then, when the water levels of the first water tank 3A and the second water tank 3B are identical, both water tank 3A and 3B switch over to the water level rising up to the full water level L (shown in the drawing as a horizontal line with two dashes), with both having the same water level. Then, at the time these reach the full water level L, water begins to be taken into a third water tank 3C, and thus the system moves on to supply of seawater to sequential downstream side water tanks 3B and 3C in the same manner.

Then, when the endmost water tank 3C is at the full water level L, water discharge, by way of the endmost water discharge opening, begins for all of the water tanks 3A, 3B, and 3C, starting from the water discharge siphon 12 of the endmost water tank 3C. The minimum water level for the water tanks 3A, 3B, and 3C varies with the difference between the water discharge volume of the endmost water tank 3C and the water supply volume of a water tank 3A that is the furthest upstream, but if the water discharge volume is more than the water supply volume, then after the water level drops to the water discharge opening 3b of the endmost water tank 3C, air enters into the endmost water discharge opening 3b and water discharge is stopped. Thereafter, water filling begins from the water tank 3A that is the furthest upstream, and then is repeated, moving on to the sequential downstream side water tanks 3B and 3C. In this plant, the tidal emersion time increases as one moves in the direction of the downstream side water tanks 3B and 3C. Furthermore, the tidal emersion time for the upper layer of cultivating tray 2 is long. Consequently, this is suitable when performing combined farming of cultivation species having different characteristics in the same plant, such as cultivation species that prefer long tidal emersion times and cultivation specifies that prefer short tidal emersion times.

Figure 15A:
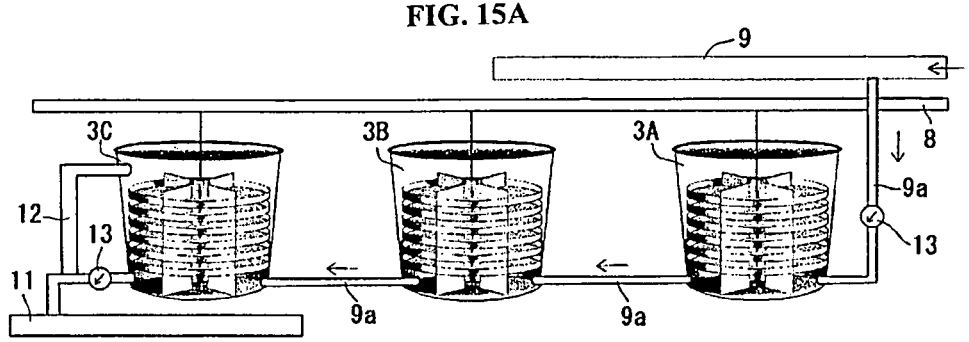
FIGS. 15A, B are schematic views of a cultivating plant using a number of devices of the present invention.
Figure 15B:
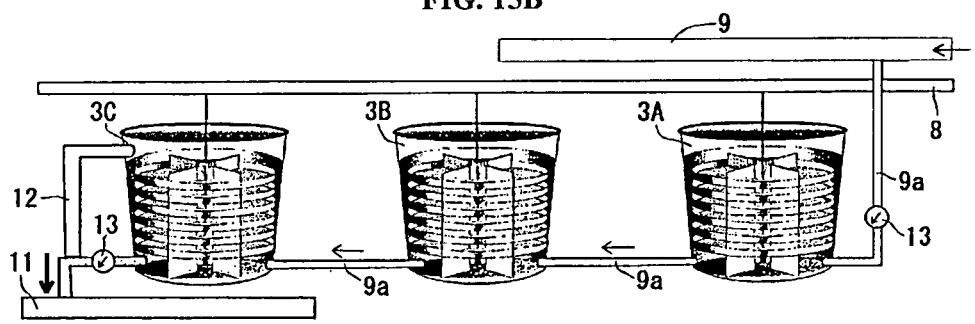

The plant shown in FIGS. 15A, B is approximately the same as the plant shown in FIGS. 14A, B, C, D, but the water discharge siphon method for the endmost water tank 3C is changed to an overflow pipe 12 and a controller-type regulation valve 13. Furthermore, the water supply side can also freely supply or discharge water in the same manner, with a controller-type regulation valve 13. This method does not make use of the natural physical phenomena that have been described, but rather completely controls the water supply and discharge and the water level fluctuation in an artificial manner, allowing the tidal emersion time to be freely controlled. Consequently, the tidal emersion time can be adjusted according to the characteristics of the cultivated organisms or the amount of feed consumed.

Figure 16A:
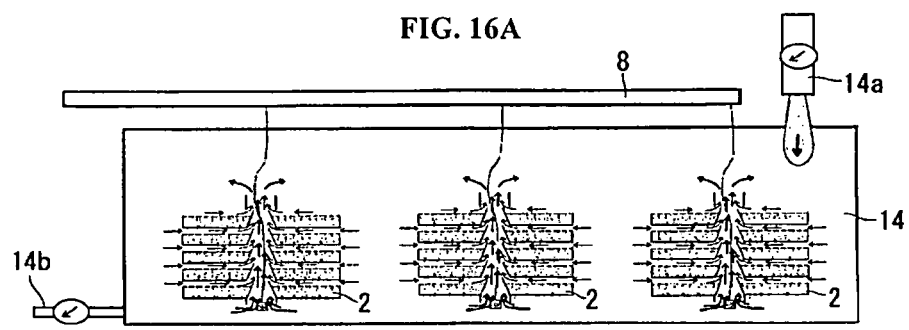
FIGS. 16A, B are schematic views of a cultivating plant using a number of devices of the present invention.
Figure 16B:
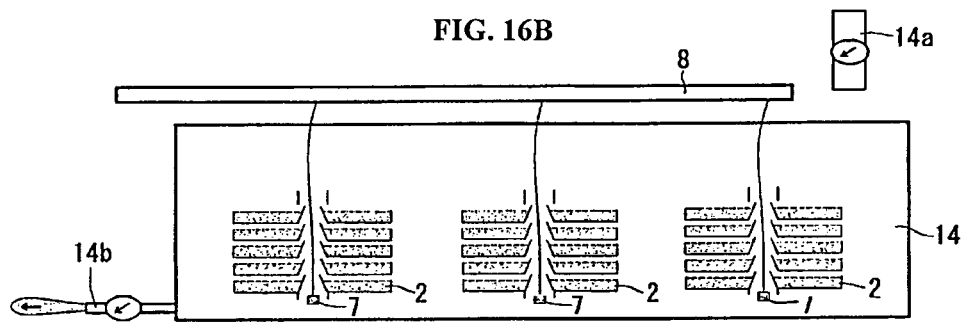

FIGS. 16A, B show a plant wherein cultivating trays 2 are incorporated in the same pool 14. The control of the tidal water level in this case is performed by a water supply pipe 14a and a water discharge opening 14b for the entire pool 14, so that independent water tanks and piping systems for the cultivating trays 2 are unnecessary. Furthermore, the rate at which the water becomes polluted can be slowed, as compared to a system that uses individual water tanks 3. If this plant is used in conjunction with the natural tidal changes of the sea, layered cultivating trays 2 alone can be used, by way of disposing these in a place where natural tides occur, such as a coast.

In contrast with conventional costal farming methods, which might be referred to as "one-story housing," the present device can be called "a high-rise housing complex," whereby production efficiency is dramatically increased. Furthermore, in order to increase production efficiency, a central cavity that passes through the stacked cultivating floors in the vertical direction, and horizontal gaps, which communicate with the cavity, between the cultivating floors, are provided so that water current in the device is promoted. Moreover, a bubble generator or a flow generator is installed so as to make water flow better into and out of the device. Furthermore, in order to provide artificial control of the cultivating environment, this is housed in a water tank comprising a water supply pipe and valve, whereby the water tank water level and the water tank water supply and discharge volume are adjusted. Thus, it is possible to adjust the amount of pollutants or feed in the water tank, and the production efficiency can be further increased.

Furthermore, if a plurality of water tanks comprising this kind of water supply and discharge pipe and valve are connected by way of pipes, a large scale farming plant can be developed, whereby production efficiency is dramatically increased. Moreover, in the plant, if a siphon pipe is used to connect to the water discharge side piping, the water level in the water tank naturally rises and falls, and low tide and high tide can be artificially recreated, whereby a tidal emersion time, which is adapted to what is being farmed, can be easily adjusted.

Specifically, land-based farming is made possible, but use is also possible in coastal farming such that this is useful as a comprehensive plant. Furthermore, because the present device has a configuration, for which single unit to large scale systems of several thousand units are possible, the scope of use thereof is large, not simply being limited to the field of aquaculture, but including use in small scale food and beverage industries, leisure industries to use in mega-production factories.

The invention claimed is:

1. A farming device for benthic organisms, the farming device being adapted to be submerged in a water tank or a body of water, and the farming device comprising:
   a housing;
   a plurality of cultivating trays stacked vertically within the housing, each one of the plurality of cultivating trays having a vertical spacing relative to a vertically adjacent other of the plurality of cultivating trays and having a horizontal spacing occurring between an outer peripheral edge of the cultivating tray and the housing;
   a central channel extending vertically and spanning at least a cumulative height of the plurality of cultivating trays;
   wherein each one of the cultivating trays comprises a plurality of arcuate sections, each one of the arcuate sections comprising a mesh bottom, an outward, circumferentially-extending wall of a first height and a radially extending wall of a second height greater than the first height;
   wherein the device is configured so that when the plurality of cultivating trays are stacked, the radially extending walls align vertically to form a barrier limiting circumferential water flow from one of said plurality of arcuate sections to an adjacent other of said arcuate sections of a common one of said plurality of cultivating trays for each one of said plurality of cultivating trays; and
   wherein for each said one of said plurality of arcuate sections there is an opening to the central channel at a radially inward portion of said one arcuate section through which water flows.

2. The farming device for benthic organisms of claim 1 further comprising a bubble generator or a flow generator for effecting flow of water into and out of the device.

3. The farming device of claim 1, wherein the central channel is tubular so as to accommodate a flow of water therethrough.

4. A method of farming benthic organisms, comprising cultivating the organisms on the cultivating floors of the device of claim 1.

5. The method of claim 4, wherein the benthic organisms are bivalves.

\* \* \* \* \*